United States Patent Office 2,947,759
Patented Aug. 2, 1960

2,947,759
ACETALDOL CONDENSATION PRODUCT AND PROCESS FOR PREPARATION

Herbert S. Johnson, Shawinigan Falls, Quebec, Canada, assignor to Shawinigan Chemicals Limited, Montreal, Quebec, Canada, a corporation of Canada No Drawing. Filed Feb. 3, 1958, Ser. No. 712,621

6 Claims. (Cl. 260—340.7)

This invention relates to a new crystalline compound prepared from acetaldol and having the structural formula:

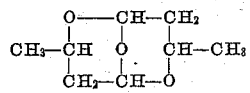

and to methods for its preparation.

The new crystalline compound can be prepared by (A) heating an acidified crude acetaldol, prepared by (1) condensation of acetaldehyde using an alkaline catalyst and (2) acidification of the crude with mineral acid, whereby the low boiling constituents present in the crude acetaldol are removed and a residue is left containing the new compound, and (B) recovering the new compound from the residue.

The remainder after the recovery of the new compound from the residue is believed to consist largely of the material designated below as Compound I. Surprisingly, this remainder is practically insoluble in water and in petroleum ether.

The heating step is preferably carried out to provide rapid heating without subjecting the acidified crude acetaldol mixture to prolonged heating which promotes side-reactions. The temperature to which the mixture should be heated to remove the low boiling constituents and promote the desired reaction should be high enough to boil off the low boiling constituents rapidly, for example preferably above 80° C., but not so high as to decompose the residue, for example, preferably not above 95° C. Preferably the mixture is heated by rapid passage through a boiler which heats the mixture and evaporates the material which can be distilled off at a vapor temperature of between about 80° and 92° C. at atmospheric pressure, and delivers the liquid residue within a heating period of less than 10 minutes, preferably less than 1 minute. A circulating flash evaporator is an example of a suitable type of boiler.

The acidified crude acetaldol used as the starting material in the preparation of the new product can be prepared by acidification of commercial crude acetaldol made by condensation of acetaldehyde using an alkaline catalyst. However the preferred method for preparing the crude acidified acetaldol is first to neutralize the alkaline catalyst by treating the crude acetaldol with carbon dioxide in excess of that required completely to neutralize the catalyst which is usually caustic soda; this treatment precipitates carbonate salts which can then be separated and removed. The neutralized crude acetaldol can then be acidified by addition of mineral acid.

Examples of mineral acids suitable for acidifying the crude acetaldol are sulphuric acid, phosphoric acid, and hydrochloric acid. A suitable concentration of sulphuric acid in the acidified acetaldol is between 0.1 and 1.0% by weight.

The residue after the removal of the low-boilers, which is a viscous liquid at room temperature, contains the new compound in solution and the compound can be isolated by known methods. For example, on standing for some time, e.g. over three hours, at room temperature, e.g. 15–25° C., this viscous liquid deposits the new compound as fine crystals which can be filtered off, preferably after the addition of about 20% by volume of methanol to the liquid. The crystals can be purified by recrystallization from methanol. Alternatively, the new compound can be extracted from the viscous liquid using an organic solvent which gives two liquid phases when mixed with the viscous liquid, for example petroleum ether. After separation of the petroleum ether layer, the ether is evaporated and the new compound is crystallized from methanol.

The elementary composition of the new compound corresponds to the empirical formula $C_8H_{14}O_3$ as shown by the comparison of calculated and analytical data:

|  | Found, percent | Calc., percent |
| --- | --- | --- |
| Carbon | 60.46 | 60.70 |
| Hydrogen | 8.97 | 9.09 |
| Oxygen, by diff | 30.57 | 30.30 |

The new compound is practically insoluble in cold water, slightly soluble in hot water, slightly soluble in cold methanol, and is somewhat more soluble in the alkanols of higher molecular weight. It is soluble in dioxane, ether, and petroleum ether. Its melting point is 114–115° C.

The new compound in solution does not absorb bromine or hydrogen, using palladium or ruthenium or active carbon as catalysts for the latter. It is recovered unchanged after treatment with hydrogen at 100° C. and a pressure of 4,000 pounds per square inch in the presence of Raney nickel. It is concluded that there is no unsaturation.

When the new compound is treated with an aqueous solution of caustic soda, none of the alkali is consumed, indicating the absence of carboxyl and ester groups. When the new compound is treated with an aqueous solution of sodium bisulphite, no bisulphite addition product is formed, suggesting the absence of aldehyde or ketone groups.

When treated with acetic anhydride in the presence of pyridine the new compound is recovered unchanged, indicating the absence of hydroxyl groups.

When a sample of the new compound was boiled in water containing a catalytic concentration of sulphuric acid (a concentration of one percent served well), crotonaldehyde (identified by its odour and its boiling point) was obtained in the distillate, the yields being as high as 93.5% of theory on the basis of one mole of the new compound, $C_8H_{14}O_3$, providing two moles of crotonaldehyde. When the distillation product was treated with 2,4-dinitro phenylhydrazine an orange precipitate formed slowly; its melting point was found to be 196.5° C. The melting point of the 2,4-dinitro phenylhydrazine derivative of an authentic sample of crotonaldehyde was found to be 198° C.; the mixed melting point of the two derivatives was 198.5°. Thus the identity of the crotonaldehyde from the new compound is confirmed.

When a sample of the new compound was boiled in water containing one percent of acetic acid for half an hour no crotonaldehyde was produced, as determined by the lack of odour, a very sensitive test for the presence of crotonaldehyde. This indicates the stability of the new compound to boiling with dilute acetic acid.

The chemical evidence suggesting the absence of unsaturation and of ester, carboxyl, carbonyl, and hydroxyl groups is in agreement with that obtained by examination of the infra-red spectrum. Thus, from the highest wave number region of the spectrum to 1460 only those peaks characteristic of C—H stretching at approximately 3,000 appear. The absence of OH (which should appear at approximately 3,300), C=O (normal position 1780–1690) and C=C (1660–1600) is thus demonstrated. Very strong bands associated with the ether linkage C—O—C appear in the region 1150–1000. Absence of coupled bands at 1600 and 1500 plus absence of a band at about 700 indicates the absence of any unsaturation in a ring structure in the compound. All numbers in this paragraph are reciprocal centimetres.

The new compound is formed by reaction of two molecules of acetaldol with the formation of hemi-acetal links between the carbonyl and hydroxyl groups to give Compound I:

$$\underset{\text{Acetaldol}}{\begin{matrix} OH \\ | \\ CH_3-CH \\ | \\ CH_2-CH \\ \| \\ O \end{matrix}} + \underset{}{\begin{matrix} O \\ \| \\ CH-CH_2 \\ | \\ CH-CH_3 \\ | \\ OH \end{matrix}} \longrightarrow \underset{\text{Compound I}}{\begin{matrix} OH \\ | \\ O---CH-CH_2 \\ | \qquad | \\ CH_3-CH \qquad CH-CH_3 \\ | \qquad | \\ CH_2-CH-O \\ | \\ OH \end{matrix}}$$

followed by loss of water, forming an internal oxygen bridge to give the new Compound II.

$$\underset{\text{Compound II}}{\begin{matrix} O---CH-CH_2 \\ | \qquad | \\ CH_3-CH \quad O \quad CH-CH_3 \\ | \qquad | \\ CH_2-CH-O \end{matrix}}$$

The systematic name for Compound II, according to Patterson and Capell's Ring Index System for organic compounds, is 3,7 dimethyl 4,8,9 trioxabicyclo (3.3.1) nonane.

Example

A quantity of crude aldol containing caustic soda catalyst was treated with carbon dioxide gas to neutralize the catalyst. The resultant precipitate of sodium bicarbonate and sodium carbonate monohydrate was removed, and 616 grams of neutralized aldol recovered. This contained about 277 grams each of acetaldol and acetaldehyde and about 62 grams of water. To this was added 18.5 grams of aqueous sulphuric acid solution containing 10% by weight of sulphuric acid (1.85 grams $H_2SO_4$). The acidified material was put through a small natural circulation evaporator having a steam heated tubular boiler. The amount of liquid in the boiler and its associated separator and circulation lines was maintained at about 50 ml. The liquid feed was added to the boiler at a rate of about 10–15 grams per minute, so that the average hold-up time of material in the boiler was about four minutes. The evaporator was operated at atmospheric pressure and the vapor temperature was between 85 and 90° C. About 200 grams of viscous high boiling liquid was drawn off from the evaporator. The 200 grams of liquid was divided into three equal portions. The first portion was allowed to cool and solid crystals of the new product crystallized and were isolated therefrom. To the second portion was added a small portion of water, which formed a separate layer and was separated and discarded after about five minutes contact without effect. Then a portion of methanol was added and the homogeneous mixture allowed to stand, whereupon the solid crystals of the new product separated and were recovered by filtration. The third portion was extracted with a portion of petroleum ether, the petroleum ether layer separated then evaporated, and the residue on evaporation treated with a portion of methanol. After heating to obtain a clear solution, the solution was allowed to cool, whereupon the new crystalline material crystallized and was separated by filtration.

The method used to recover the new material from the third portion was the most convenient method for isolating the crystals, and the yield obtained from this portion indicated that 26 grams of crystals could have been obtained by treating all of the viscous liquid according to this procedure. The theoretical yield from the 277 grams of acetaldol on the basis of one mole of the compound $C_8H_{14}O_3$ from 2 moles of $C_4H_8O_2$ is 248 grams. The 26 grams actually obtainable represents therefore 10.5% of the theoretical yield.

The new compound is a very convenient source of crotonaldehyde. The new compound may be substituted for crotonaldehyde in its reaction with hydroxyl-containing compounds, for example, in the preparation of the crotonaldehyde acetal of polyvinyl alcohol. Thus the new compound may be considered as a convenient solid form in which to store crotonaldehyde.

This application is a continuation-in-part of my earlier application Serial Number 532,788, filed 6 September 1955, now abandoned.

What is claimed is:

1. The compound having the structural formula:

$$\begin{matrix} O---CH-CH_2 \\ | \qquad | \\ CH_3-CH \quad O \quad CH-CH_3 \\ | \qquad | \\ CH_2-CH-O \end{matrix}$$

2. A process for the production of the compound of claim 1 comprising:

(a) neutralizing crude acetaldol, prepared by condensation of acetaldehyde using an alkaline catalyst, by addition of carbon dioxide in excess to the crude acetaldol, thus forming a precipitate of carbonate salts in the acetaldol, (b) removing said precipitate of carbonate salts from said neutralized acetaldol, (c) acidifying the neutralized acetaldol with a mineral acid to a pH below 7.0, (d) heating the acidified crude acetaldol to remove the low boiling constituents of the crude and leave a residue containing said compound, (e) and recovering said compound from said residue.

3. A process as claimed in claim 2 in which said mineral acid is selected from the group consisting of $H_2SO_4$, $H_3PO_4$, and HCl, and the acidified crude acetaldol is heated until the vapors of said low boiling constituents are evolved at 90° C. at atmospheric pressure.

4. The process of claim 2 wherein the recovery step comprises:

(a) cooling the residue at a temperature between 15° C. and 25° C. for at least three hours whereby crystals of the said compound are precipitated, and, thereafter, (b) separating the precipitated crystals of the said compound from the residue.

5. The process of claim 2 wherein the recovery step comprises:

(a) extracting the said compound from the residue with an organic solvent for said compound selected from the group consisting of petroleum ether, ether and dioxane, and (b) separating the said compound from the solvent phase.

6. A process as claimed in claim 2, wherein the mineral acid is sulphuric acid and is within the range of 0.1% to 1.0% by weight.

References Cited in the file of this patent

UNITED STATES PATENTS

| | | |
|---|---|---|
| 1,450,984 | Matheson | Apr. 10, 1923 |
| 2,517,013 | Miller | Aug. 1, 1950 |
| 2,713,598 | Alheritiere | July 19, 1955 |

FOREIGN PATENTS

| | | |
|---|---|---|
| 950,337 | France | Sept. 23, 1949 |
| 585,299 | Great Britain | Feb. 4, 1947 |

OTHER REFERENCES

Patterson: Ring Index, Reinhold, New York (1940), p. 147.

E. B. Connolly: J. Chem. Soc. (London), 1943, p. 42.

R. Adams: J. Am. Chem. Soc., vol. 44, pp. 1126–1133 (1922).

Morton: Laboratory Technique in Organic Chemistry, McGraw Hill, New York (1938), p. 198.

Ser. No. 375,016, Szlatinay (A.P.C.), published Apr. 20, 1943.